United States Patent
Kamali et al.

(10) Patent No.: US 10,690,809 B2
(45) Date of Patent: Jun. 23, 2020

(54) ANGLE MULTIPLEXED METASURFACES

(71) Applicant: CALIFORNIA INSTITUTE OF TECHNOLOGY, Pasadena, CA (US)

(72) Inventors: Seyedeh Mahsa Kamali, Arcadia, CA (US); Ehsan Arbabi, Arcadia, CA (US); Amir Arbabi, Sunderland, MA (US); Yu Horie, Pasadena, CA (US); MohammadSadegh Faraji-Dana, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/125,546

(22) Filed: Sep. 7, 2018

(65) Prior Publication Data
US 2020/0025975 A1    Jan. 23, 2020

Related U.S. Application Data

(60) Provisional application No. 62/561,523, filed on Sep. 21, 2017.

(51) Int. Cl.
*G02B 1/00*    (2006.01)
*G02B 1/02*    (2006.01)
*G02B 5/02*    (2006.01)
*G02B 5/08*    (2006.01)

(52) U.S. Cl.
CPC .............. *G02B 1/002* (2013.01); *G02B 1/02* (2013.01); *G02B 5/0294* (2013.01); *G02B 5/0808* (2013.01)

(58) Field of Classification Search
CPC ........ G02B 1/002; G02B 1/02; G02B 5/0294; G02B 5/0808
See application file for complete search history.

(56) References Cited

U.S. PATENT DOCUMENTS

2014/0193301 A1* 7/2014 Xiong .................. G01J 3/44
                                                    422/69
2019/0137655 A1* 5/2019 Liu ..................... H01Q 7/00

OTHER PUBLICATIONS

Kamali et al. "Angle-Multiplexed Metasurfaces: Encoding Independent Wavefronts in a Single Metasurface under Different Illumination Angles" Physical Review X, 7, 041056 (Year: 2017).*
Aieta, F. et al. "Multiwavelength achromatic metasurfances by dispersive phase compensation" *Science* 347, 1342-1345 (2015). 5 pages.
Arbabi, A. et ai. "Dielectric metasurfaces for complete control of phase and polarization with subwavelength spatial resolution and high transmission" *Nature Nanotechnology* 10, 937-943 (Nov. 2015). 8 pages.

(Continued)

*Primary Examiner* — George G King
(74) *Attorney, Agent, or Firm* — Steinfl + Bruno LLP

(57) ABSTRACT

A metasurface is defined by an array of scattering elements having a U shape, where the geometrical dimensions determining the U shape are determined according to the different phase profiles that the metasurface is meant to generate in response to an incident electromagnetic wave. The metasurface, therefore, generates different phase shifts as a function of the incident electromagnetic wave.

20 Claims, 11 Drawing Sheets

(56) References Cited

OTHER PUBLICATIONS

Arbabi, A. et al, "Efficient dielectric metasurface collimating lenses for mid-infrared quantum cascade lasers" *Optics Express* 23(26), 33310-33317 (2015).
Arbabi, A. et al. "Planar metasurface retroreflector" *Nature Photonics* 11, 415-420, (Jun. 2017). 7 pages.
Arbabi, A. et al, "Subwavelength-thick Lenses with High Numerical Apertures and Large Efficiency Based on High-Contrast Transmitarrays" *Nature Communications* 6; 7069, (2015). 11 pages.
Arbabi, E. et al. "Controlling the sign of chromatic dispersion in diffractive optics with dielectric metasurfaces" *Optica* 4, 625-632 (Jun. 2017). 9 pages.
Astilean, S. et al. "High-efficiency subwavelength diffractive element patterned in a high-refractive-index material for 633 nm" *Optics Letters* 23(7), 552-554 (Apr. 1998).
Backlund, M.P. et al. "Removing Orientation-Induced Localization Biases in Single-Molecule Microscopy Using a Broadband Metasurface Mask" *Nature Photonics* 10, 459-462 (Nov. 2016). 14 pages.
Bouchard, F. et al. "Optical spin-to-orbital angular momentum conversion in ultra-thin metasurfaces with arbitrary topological charges" *Applied Physics Letters* 105(10), 101905 (Sep. 2014). 4 pages.
Cencillo-Abad, P. et al. "Electro-mechanical light modulator based on controlling the interaction of light with a metasurface" *Scientific Reports* 7, 5405 (Jul. 2017). 7 pages.
Chen K. et al. "A Reconfigurable Active Huygens' Metalens" *Advanced Materials* 29(17), (Feb. 2017). 21 pages.
Chen, W.T. et al. "immersion Meta-Lenses at Visible Wavelengths for Nanoscale Imaging" *Nano Letters* 17, 3188-3194 (2017). 7 pages.
Choudhury, S. et al. "Pancharatnarn-Berry Phase Manipulating Metasurface for Visible Color Hologram Based on Low Loss Silver Thin Film" *Advanced Optical Materials* 5, 1700196, (2017). 6 pages.
Colburn, S. et al. "Tunable metasurfaces via subwavelength phase shifters with uniform amplitude" *Scientific Reports* 7, 40174 (Jan. 2017). 9 pages.
Desiatov, B. et al. "Polarization selective beam shaping using nanoscale dielectric metasurfaces" *Optics Express* 23(17), 22611-22618 (Aug. 2015).
Di Falco, A. et al. "Optical metasurfaces with robust angular response on flexible substrates" *Applied Physics Letters* 99, 163110 (2011). 4 pages.
Ding, F. et al. "Broadband High-Efficiency Half-Wave Plate: A Supercell-Based Plasmonic Metasurface Approach" *ACS Nano* 9(4), 4111-4119 (2015).
Ding, F. et al. "Gradient metasurfaces: a review of fundamentals and applications" *Reports on Progress in Physics* 81, 026401, (2017). 44 pages.
Fairchild, R.C. et al. "Computer-originated aspheric holographic optical elements" *Optical Engineering* 21(1), 133-140, (Jan. 1982).
Fattal, D. et al. "Flat dielectric grating reflectors with focusing abilities" *Nature Photonics* 4, 466-470 (Jul. 2010).
Feng, S. et al. "Correlations and Fluctuations of Coherent Wave Transmission through Disordered Media" *Physical Review Letters* 61(7), 834-837, (Aug. 1988).
Forouzmand, A. et al. "All-Dielectric C-Shaped Nanoantennas for Light Manipulation: Tailoring Both Magnetic and Electric Resonances to the Desire" *Advanced Optical Materials* 5, 1700147, (2017). 15 pages.
Genevet, P. et al. "Recent advances in planar optics: from piasmonic to dielectric metasurfaces" *Optica* 4(1), 139-152 (Jan. 2017). 15 pages.
Hsiao, H.-H. et al. "Fundamentals and Applications of Metasurfaces" *Small Methods* 1, 1600064, (2017). 20 pages.
Jahani, S. et al, "Ali-dielectric metamaterials" *Nature Nanotechnology* 11, 23-36, (Jan. 2016).
Jha, P. K. et al. "Metasurface-Enabled Remote Quantum interference" *Physical Review Letters* 115, 025501, (Jul. 2015). 5 pages.

Jiang, Z.H. et al. "Broadband and Wide Field-of-view Plasmonic Metasurface-enabled Waveplates" *Scientific Reports* 4, 7511, (Dec. 2014), 8 pages.
Jiang; L. et al. "Multifunctional Hyperbolic Nanogroove Metasurface for Submolecular Detection" *Small* 13, 1700600, (2017). 9 pages.
Kamali, S.M. et al. "Highly tunable elastic dielectric metasurface lenses" *Laser and Photonics Reviews* 10(6), 1002-1008, (2016). 18 pages.
Khorasaninejad, M. et al. "Metalenses at visible wave-lengths: Diffraction-limited focusing and subwavelength resolution imaging" *Science* 352, 1190-1194 (2016), 6 pages.
Kuznetsov, A.I. et al. "Optically resonant dielectric nanostructures" *Science* 354, 846 aag2472, (Nov. 2016). 10 pages.
Lalanne, P. et al. "Blazed binary subwavelength gratings with efficiencies larger than those of conventional echeletie gratings" *Optics Letters* 23(14), 1081-1083 (Jul. 1998).
Li, K. et al. "Widely tunable 1060-nm VCSEL with high-contrast grating mirror" *Optics Express* 25(10), 11844-11854, (May 2017). 12 pages.
Lin, D. et al. "Optical metasurfaces for high angle steering at visible wavelengths" *Scientific Reports* 7, 2286, (May 2017). 8 pages.
Lin, D. et al. "Photonic Multitasking Interleaved Si Nanoantenna Phased Array" *Nano Letters* 16, 7671-7676, (2016).
Lin, Z. et al. "Topology optimized multi-layered meta-optics" *Physical Review Applied* 9, 044030, (2018). 6 pages.
Liu, S. et al. "Huygens' Metasurfaces Enabled by Magnetic Dipole Resonance Runing in Split Dielectric Nanoresonators" *Nano Letters* 17, 4297-4303, (2017).
Liu, V. et al. "S4 : A free electromagnetic solver for layered periodic structures" *Computer Physics Communications* 183, 2233-2244, (2012). 13 pages.
Maguid, E. et al, "Multifunctional interleaved geometric-phase dielectric metasurfaces" *Light: Science & Applications* 6, e17027, (2017). 7 pages.
Mueller, J.P.B. et al. "Metasurface Polarization Optics: Independent Phase Control of Arbitrary Orthogonal States of Polarization" *Physical Review Letters* 118, 113901, (2017). 5 pages.
Ong, J.R., et al. "Freestanding dielectric nanohole array metasurface for mid-infrared wavelength applications" *Optics Letters* 42(13), 2639-2642, (Jul. 2017).
Oskooi, A.F. et al. "MEEP: A flexible free-software package for electromagnetic simulations by the FDTD method" *Computer Physics Communications* 181, 687-702, (Jan. 2010). 31 pages.
Paniagua-Dominguez, R. et al. "A Metalens with Near-Unity Numerical Aperture" *Nano Letters* 18, 2124-2132, (2018).
Parry, M. et al. "Active tuning of high-Q dielectric metasurfaces" *Applied Physics Letters* 111, 053102 (2017). 5 pages.
Pfeffer, C. et al. "Cascaded metasurfaces for complete phase and polarization control" *Applied Physics Letters* 102, 231116, (2013). 5 pages.
Qiao, P. et al. "Recent advances in high-contrast metastructures, metasurfaces, and photonic crystals" *Advances in Optics and Photonics* 10(1), 180-245, (Mar. 2018).
Ren, Y. et al. "Orbital Angular Momentum-based Space Division Multiplexing for High-capacity Underwater Optical Communications" *Scientific Reports* 6, 33306, (Sep. 2016). 10 pages.
Sell, D. et al. "Large-Angle, Multifunctional Metagratings Based on Freeform Multimode Geometries" *Nano Letters* 17, 3752-3757, (2017).
Silva, A. et al. "Performing Mathematical Operations with Metamaterials" *Science* 343, 160-163 (Jan. 2014). 5 pages.
Staude, I. et al. "Metamaterial-inspired silicon nanophotonics" *Nature Photonics* 11, 274-284, (May 2017).
Thyagarajan, K. et al, "Millivolt Modulation of Piasmonic Metasurface Optical Response via ionic Conductance" *Advanced Materials* 29, 1701044, (2017). 8 pages.
Vo, S. et al. "Sub-Wavelength Grating Lenses With a Twist" *IEEE Photonics Technology Letters* 26(13), 1375-1378, (Jul. 2014).
Wang, L. et al. "Grayscale transparent metasurface holograms" *Oplica* 3(12), 1504-1505, (Dec. 2016).
Yang, J. et al. "Topology-optimized metasurfaces: impact of initial geometric layout" *Optics Letters* 42(16), 3161-3164, (Aug. 2017).

(56) References Cited

OTHER PUBLICATIONS

Yang, Y. et al. "Multimode directionality in all-dielectric metasurfaces" *Physical Review B* 95, 16426, (2017). 10 pages.
Yu, Y.F. et al. "High-transmission dielectric metasurface with 2pi phase control at visible wavelengths" *Laser Photonics & Photonics Reviews* 9(4), 412-418, (2015). 9 pages.
Zhao, Y. et al. "Homogenization of plasmonic metasurfaces modeled as transmission-line loads" *Metamaterials* 5, 90-96, (2011).
Zheng, Q. et al. "Wideband, wide-angle coding phase gradient metasurfaces based on Pancharatnam-Berry phase" *Scientific Reports* 7, 43543; (Mar. 2017). 13 pages.
Zhou, Z, et al. "Efficient Silicon Metasurfaces for Visible Light" *ACS Photonics* 4, 544-551, (2017).
Zhu, A.Y. et al. "Traditional and emerging materials for optical metasurfaces" *Nanophotonics* 6, 452-471, (2017).
Arbabo, A., et al. "Miniature optical planar camera based on a wide-angle metasurface doublet corrected for monochromatic aberrations", *Nature Communications* 7, 13682, (Nov. 2016). 9 pages.
Arbabi, E., et al. "High efficiency double-wavelength dielectric metasurface lenses with dichroic birefringent meta-atoms", *Optics Express* 24, 18468-18477, (Aug. 2016). 9 pages.
Arbabi, E., et al. "Multiwavelength metasurfaces through spatial multiplexing", *Scientific Reports* 6, 32803, (Sep. 2016). 8 pages.
Arbabi, E., et al. "Multiwavelength polarization-insensitive lenses based on dielectric metasurfaces with meta-molecules", *Optica* 3, 628-633 (Jun. 2016). 6 pages.
Kamali, S. M., et al. "Decoupling optical function and geometrical form using conformal flexible dielectric metasurfaces", *Nature Communications* 7, 11618, (May 2016). 7 pages.

* cited by examiner

ANGLE MULTIPLEXED METASURFACES

CROSS REFERENCE TO RELATED APPLICATIONS

The present application claims priority to U.S. Provisional Patent Application No. 62/561,523, filed on Sep. 21, 2017, the disclosure of which is incorporated herein by reference in its entirety.

STATEMENT OF INTEREST

This invention was made with government support under Grant No. W911NF-14-1-0345 awarded by the Army and Grant No. DE-SC0001293 awarded by the Department of Energy. The government has certain rights in the invention.

TECHNICAL FIELD

The present disclosure relates to optical metasurfaces. More particularly, it relates to angle multiplexed metasurfaces.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
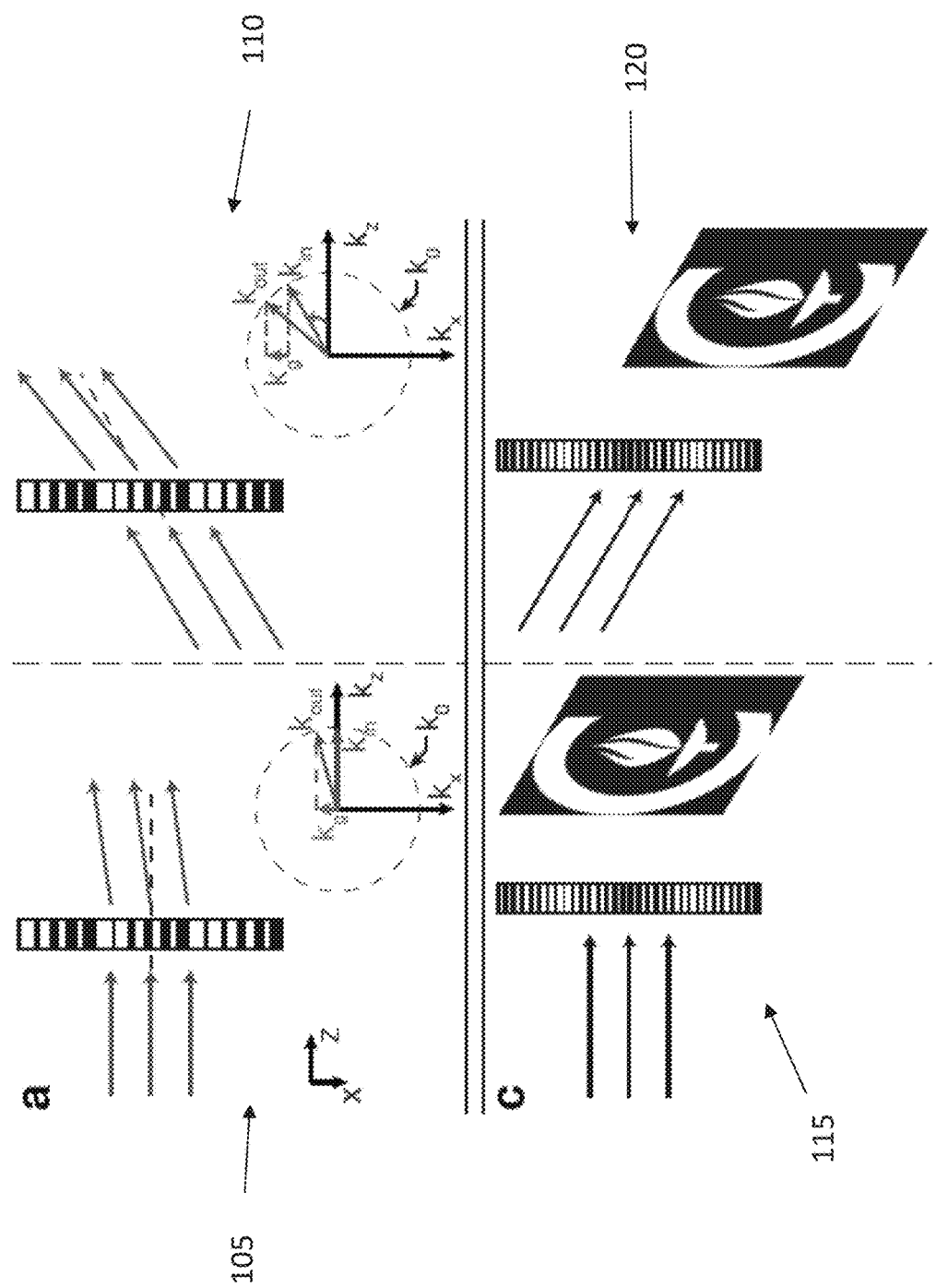
FIG. 1 illustrates the optical response of a conventional metasurface.

In a first aspect of the disclosure, a metasurface is described, the metasurface comprising: a metallic reflector; a spacer layer on the metallic reflector; an array of scattering elements on the spacer layer, each scattering element of the array of scattering element having a height, and a U cross section defined by four cross section dimensions, wherein: the four cross section dimensions are $D_x$, $D_y$, $D_{xin}$, and $D_{yin}$, at least one scattering element of the array of scattering elements has a different value than at least one other scattering element of the array of scattering elements, for at least one of $D_x$, $D_y$, $D_{xin}$, and $D_{yin}$, the height and $D_x$, $D_y$, $D_{xin}$, and $D_{yin}$ for each scattering element of the array of scattering elements are selected so that a first electromagnetic wave incident at a first angle to the metasurface is reflected with a first phase shift, and a second electromagnetic wave incident at a second angle to the metasurface is reflected with a second phase shift, the first angle is different from the second angle, and the first phase shift is different from the second phase shift.

In a second aspect of the disclosure, a metasurface is described, the metasurface comprising: a spacer layer; an array of scattering elements on the spacer layer, each scattering element of the array of scattering element having a height, and a U cross section defined by four cross section dimensions, wherein: the four cross section dimensions are $D_x$, $D_y$, $D_{xin}$, and $D_{yin}$, at least one scattering element of the array of scattering elements has a different value of at least one of $D_x$, $D_y$, $D_{xin}$, and $D_{yin}$, the height and $D_x$, $D_y$, $D_{xin}$, and $D_{yin}$ for each scattering element of the array of scattering elements are selected so that a first electromagnetic wave incident at a first angle to the metasurface is transmitted with a first phase shift, and a second electromagnetic wave incident at a second angle to the metasurface is transmitted with a second phase shift, the first angle is different from the second angle, and the first phase shift is different from the second phase shift.

In a third aspect of the disclosure, a method is described, the method comprising: for an array of scattering elements, each scattering element of the array of scattering element having a height, and a U cross section defined by four cross section dimensions, calculating values of the height and of the four cross section dimensions generating a first phase shift and a second phase shift; fabricating a metasurface comprising the array of scattering elements, based on the calculated values of the height of the four cross section dimensions, so that a first electromagnetic wave incident at a first angle to the metasurface is reflected with the first phase shift, and a second electromagnetic wave incident at a second angle to the metasurface is reflected with the second phase shift, wherein: the four cross section dimensions are $D_x$, $D_y$, $D_{xin}$, and $D_{yin}$, at least one scattering element of the array of scattering elements has a different value than at least one other scattering element of the array of scattering elements, for at least one of $D_x$, $D_y$, $D_{xin}$, and $D_{yin}$, the first angle is different from the second angle, and the first phase shift is different from the second phase shift.

DETAILED DESCRIPTION

The present disclosure describes metasurfaces which can each encode independent wavefronts in a single metasurface, under different incident illumination angles. Therefore, each electromagnetic wave incident from a specific angle can be encoded in a different way, by the single metasurface, relative to electromagnetic waves incident from other angles.

As known to the person of ordinary skill in the art, the angular response of thin diffractive optical elements is generally highly correlated. For example, the angles of incidence and diffraction of a grating are locked through the grating momentum, determined by the grating period. Other diffractive devices, including conventional metasurfaces known in the art, have a similar angular behavior due to the fixed locations of the Fresnel zone boundaries, and the weak angular sensitivity of the meta-atoms. By meta-atoms, the present disclosure refers to the individual scattering elements that form a metasurface. These scattering elements may have different geometrical shapes. For example, the metasurface may comprise elliptical cylinders whose major axis (of their cross section) is oriented in different directions within the plane of the metasurface. By engineering the shape, density, spacing, and orientation of the individual scattering elements, or groups of scattering elements, it is possible to engineer the optical response of the metasurface to incident radiation. For example, a metasurface may change the polarization of an incident electromagnetic wave, with the specific change in polarization being determined by the way the scattering elements of the metasurface are designed.

The present disclosure describes metasurfaces that alter this fundamental property of known metasurfaces. In particular, the present disclosure describes angle-multiplexed metasurfaces, composed of reflective high-contrast dielectric U-shaped meta-atoms, whose optical response, under illumination from different angles, can be controlled independently. In other words, the metasurface comprises, in some embodiments, an array of scattering elements which have a U shape. The metasurfaces of the present disclosure enable flat optical devices that impose different and independent optical transformations when illuminated from different directions, a capability not previously available in diffractive optics.

The concept of angular correlation is schematically depicted in FIG. 1 panel a for a diffraction grating. In diffraction gratings, the diffraction angle $\theta_m$ of order m is related to the incident angle $\theta_{in}$ by equation: $d(\sin(\theta_m)-\sin(\theta_{in}))=m\lambda$, where $\lambda$ is the wavelength, and d is the grating period, determined solely by the geometry. Therefore, a grating adds a fixed "linear momentum", dictated by its period, to the momentum of the incident light, regardless of the incident angle. Similarly, as illustrated in FIG. 1 panel c, a regular hologram designed to project a certain image when illuminated from a given angle will project the same image (with possible distortions and efficiency reduction) when illuminated from a different angle. FIG. 1 illustrates a first incident angle (105) and a second incident angle (110). The momentum added by the grating is the same for both cases (105) and (110).

Figure 2:
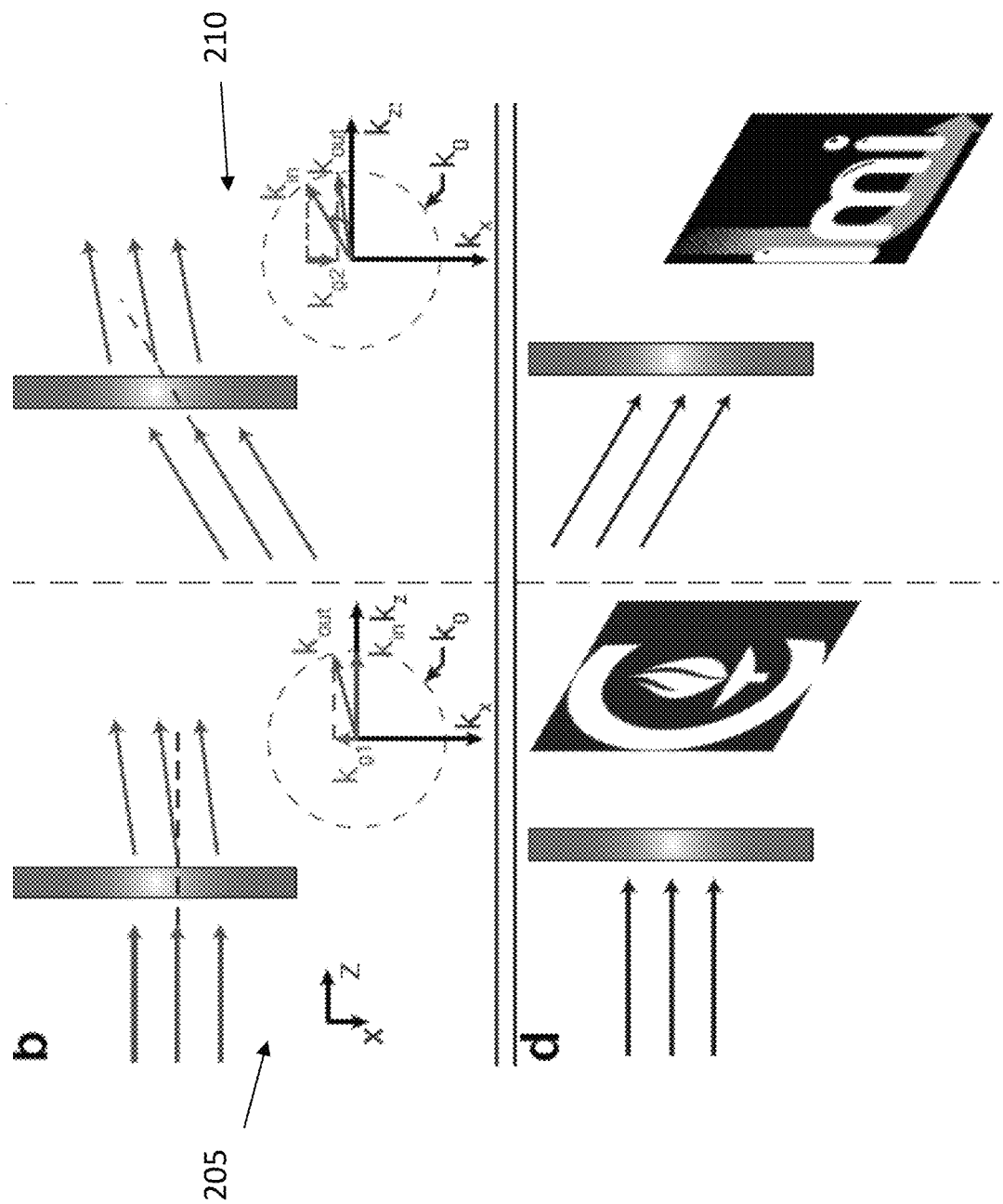
FIG. 2 illustrates the optical response of an angle-multiplexed metasurface.

FIG. 2 panel b illustrates the optical response of an angle-multiplexed grating that adds a different "linear momentum" depending on the angle of incidence. FIG. 2 illustrates two different angles of incidence (205) and (210). FIG. 2 panel d illustrates an angle-multiplexed hologram that displays a different image depending on the angle of incidence. It can be noted from the vector sum in FIG. 2 that the momentum added by the grating is different according to the incident angle. Breaking this fundamental correlation and achieving independent control over distinct incident angles is conceptually new, and results in the realization of a new category of compact multifunctional devices, which allow for embedding several functions into a thin single metasurface.

FIG. 1, panel a, illustrates a schematic of the diffraction of light by a grating. A grating adds a fixed linear momentum ($hk_g$) to the incident light, independent of the illumination angle. If the illumination angle deviates from the designated incident angle, light is deflected to a different angle which is dictated by the grating period. FIG. 2 panel b illustrates the angle-multiplexed metasurface of the present disclosure, which provides different responses according to the illumination angle. For instance, two gratings with different deflection angles (different grating momenta) can be multiplexed such that different illumination angles acquire different momenta.

FIG. 1 panel c illustrates a typical hologram that creates one specific image under one illumination angle (115). The same hologram will be translated laterally (and distorted) by tilting the illumination angle (120). FIG. 2 panel d illustrates a schematic of an angle-multiplexed hologram. Different images are created under different illumination angles. For ease of illustration, the devices are shown in transmission, but in other embodiments the devices are designed to operate in reflection mode. In fact, in several embodiments, the metasurfaces of the present disclosure operate in reflection mode, including a reflector layer.

Optical metasurfaces are two-dimensional arrangements of a large number of discrete meta-atoms (individual scattering elements), that enable precise control of optical wavefronts with subwavelength resolution. Several devices with the ability to control the phase, polarization, and amplitude of light are known in the art. These devices can directly replace traditional bulk optical components like gratings, lenses, waveplates, polarizers, holograms, and orbital angular momentum generators, or even provide novel functionalities not feasible with conventional components. For wavelengths in the range from mid infrared (IR) to optical (visible light), high contrast dielectric metasurfaces are very versatile, as they can be designed to control different properties of light with subwavelength resolution, and with large reflection or transmission efficiencies.

Like other diffractive devices, commonly known metasurfaces that locally control the optical wavefront (e.g. lenses, beam deflectors, holograms) generally have a fixed response when illuminated from different incident angles, with possible distortions and reduction in efficiency at illumination angles other than the optimal angle for which they are designed. The main reason for this correlated behavior is that the Fresnel zone boundaries (i.e., the generalized grating period) have constant locations for the devices known in the art. The Fresnel zone boundaries, for these devices known in the art, determine the device function irrespective of the incident angle. Moreover, in almost all known diffractive and metasurface structures, the phase and its local gradient (which is proportional to the local momentum change) have a small dependence on the incident angle. This dependence results in a large range for the optical memory effect.

In the present disclosure, angle-multiplexed metasurfaces are described for simultaneous encoding of different arbitrary phase profiles for different illumination angles of a single sub-wavelength thick metasurface. In some embodiments, the angle-dependent metasurfaces are based on reflective high-contrast dielectric meta-atoms to break the fundamental optical memory effect of metasurfaces, and provide independent control over the reflection phase of light at two or more different incident angles. As a result, any two different functionalities can be embedded in a metasurface, and can be separately accessed with different illumination angles.

In the following, some embodiments of exemplary metasurfaces are described, specifically angle-multiplexed reflective gratings with different effective grating periods under transverse electric (TE) polarized 0° and 30° illumination angles, as illustrated in FIG. 2 panel b. In addition, an angle-multiplexed hologram is also described, which encodes and projects different holographic images under normal and 30° illumination angles, with TE polarization, as illustrated in FIG. 2 panel d.

Figure 3:
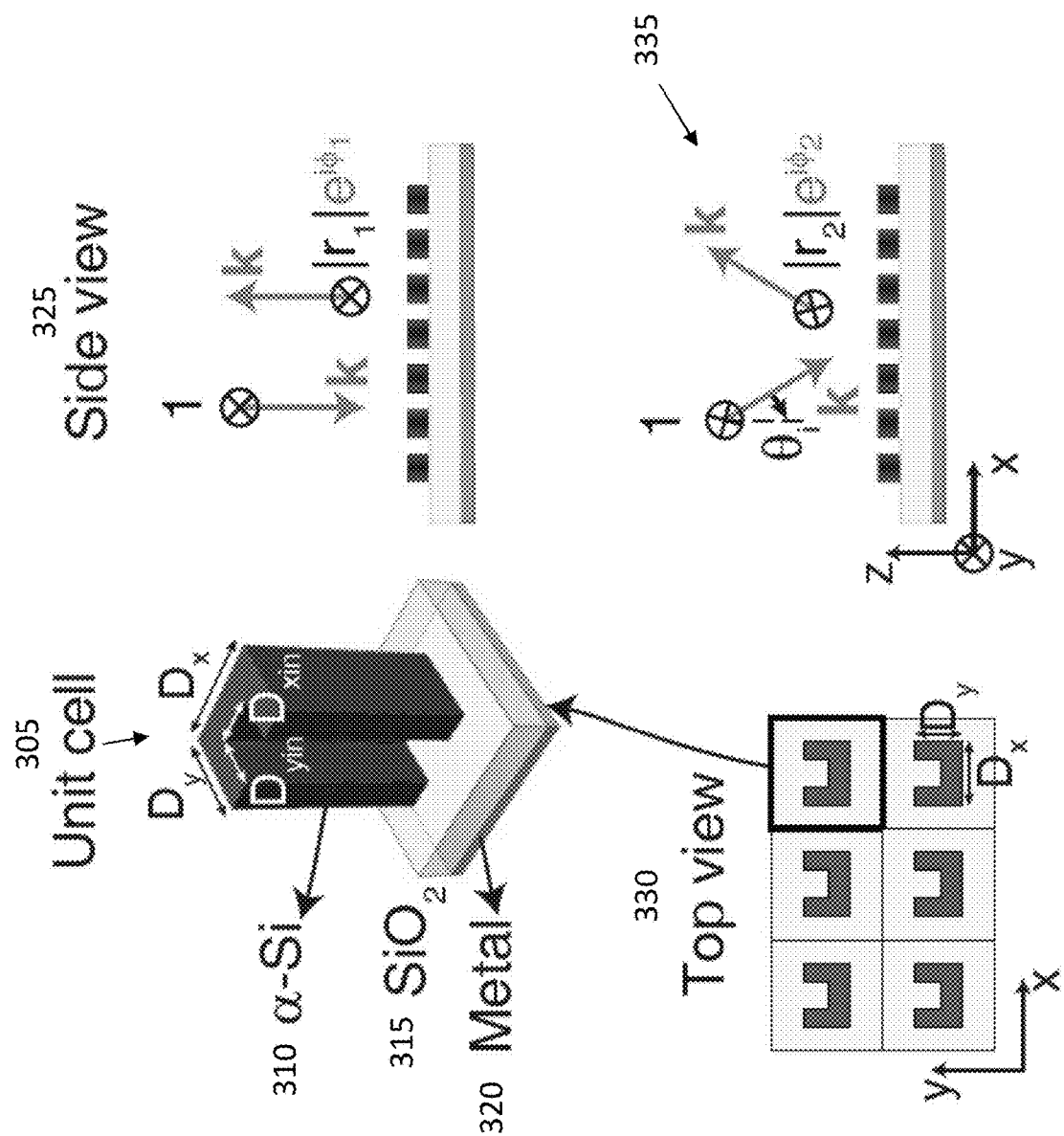
FIGS. 3-5 illustrate exemplary meta-atom structures and corresponding design graphs.
Figure 4:
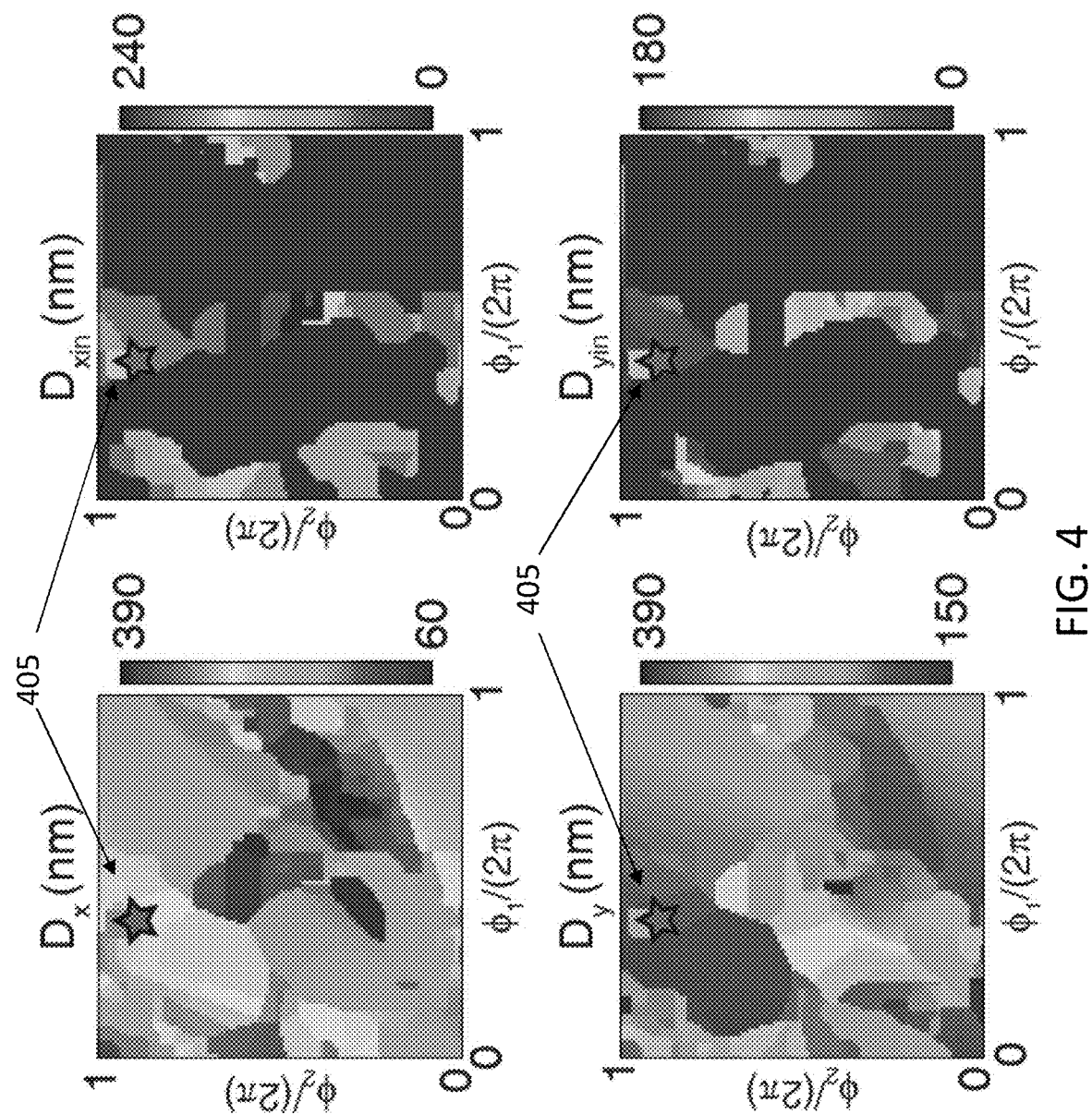
Figure 5:
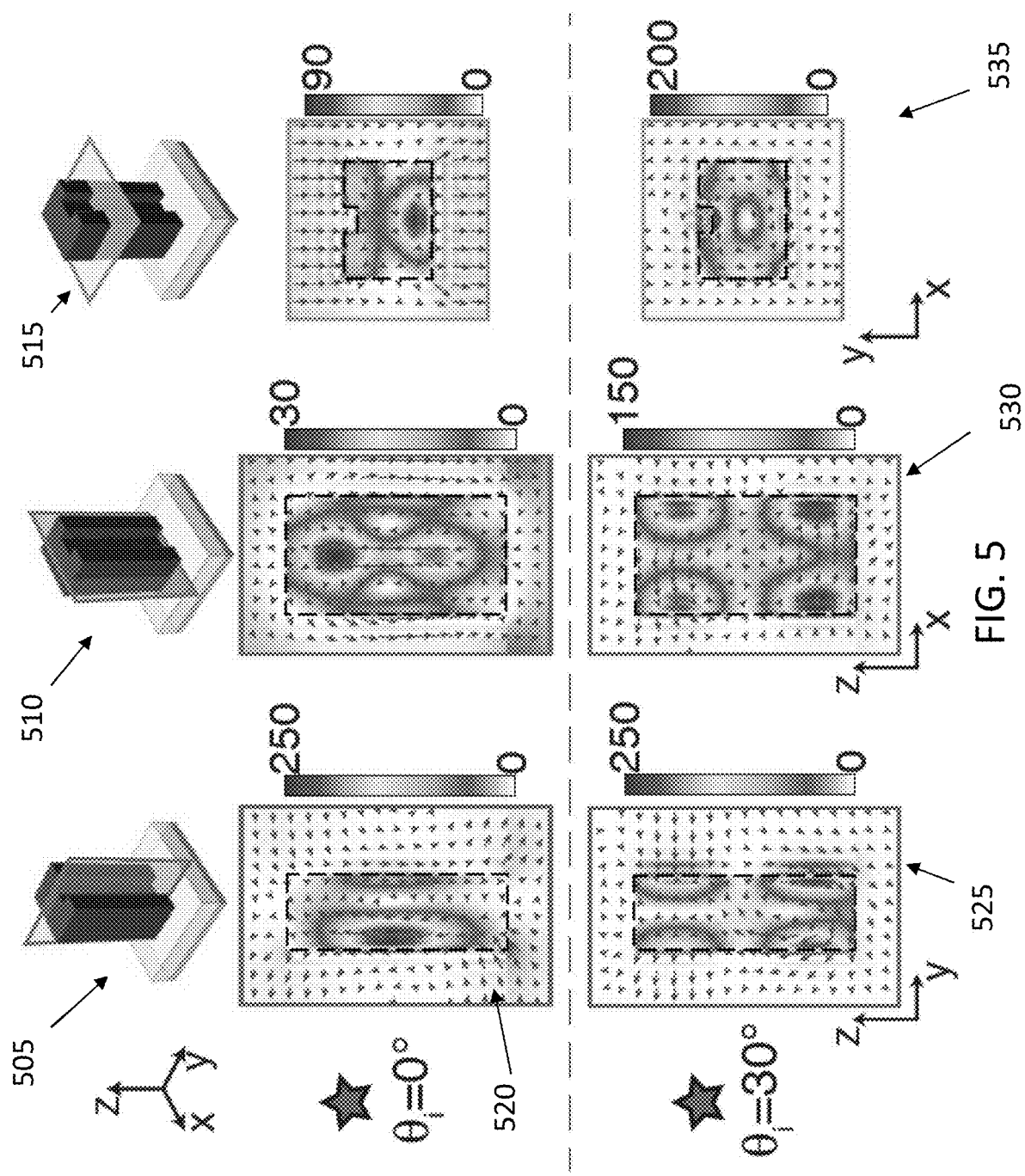

FIGS. 3-5 illustrate exemplary meta-atom structures and corresponding design graphs. FIG. 3 illustrates a schematic drawing of a uniform array of U-shaped α-Si (amorphous Si) meta-atoms, arranged in a square lattice resting on a thin SiO$_2$ spacer layer on a reflective surface (i.e., a metallic mirror). The array provides an angle-dependent optical response, such that TE-polarized light at 0° and 30° illumination angles undergoes different phase shifts upon reflection from the array. FIG. 3 illustrates a perspective view of a single scatterer of the array (305), with a U-shaped structure of amorphous Si (310), on a layer of Si dioxide (315), over a metallic reflector (320). FIG. 3 also illustrates side views of the array (325,335), with k vectors for the incident and reflected electromagnetic waves, and a top view of the array (330).

FIG. 4 illustrates simulated values for the dimensions of exemplary U-shaped meta-atoms ($D_x$, $D_y$, $D_{xin}$, and $D_{yin}$) for achieving full $2\pi$ phase shifts for TE-polarized light at 0° and 30° illumination angles, respectively. From FIG. 4, it is possible to find the values of the four dimensions of a meta-atom which impose $\phi_1$ and $\phi_2$ reflection phase shifts onto TE-polarized optical waves, where the optical waves are either normal to the surface or at a 30° incident angle. In other words, once the desired $\phi_1$ and $\phi_2$ are set, from the plots in FIG. 4 it is possible to find the four dimensions of the U-shaped meta-atoms to be fabricated.

FIG. 5 illustrates the electric energy density inside a single unit cell, in a periodic uniform lattice of scatterers, at 0° and 30° illumination angles. The electric energy is plotted for three cross sections (505,510,515), with each cross section (505,510,515) corresponding to the two graphs plotted correspondingly, below (525,530,535). Each of the two graphs, for each cross section, is for the two illumination angles, 0° and 30°. Arrows (520) in the plots indicate in-plane electric field distributions excited at each illumination angle. Different field distributions, at normal and 30° incidence, are an indication of excitation of different resonant modes under different incident angles. For the example of FIG. 5, the meta-atoms are 500 nm tall. The silicon dioxide and aluminum layers are 125 nm and 100 nm thick respectively, the lattice constant for the array of scatterers is 450 nm, and all simulations are performed at the wavelength of 915 nm.

A meta-atom structure capable of providing independent phase control under TE-polarized light illumination, with 0° and 30° incident angles, is shown in FIG. 3. The amorphous silicon ($\alpha$-Si) meta-atoms have a U-shaped cross section (and therefore can be referred to as U meta-atoms) and are located at the vertices of a periodic square lattice. The lattice is placed on a low refractive index silicon dioxide ($SiO_2$) layer, and an aluminum oxide ($Al_2O_3$) spacer layer backed by an aluminum reflector. In some embodiments, the alumina layer can be placed between the silica layer and the aluminum reflector. In other embodiments, the alumina layer can be omitted. Since the electric field is highly localized in the nano-posts, the low-loss, low refractive index dielectric spacer between the nano-posts and the metallic reflector is necessary to avoid high losses from the metallic reflector. In addition, the spacer layer allows for efficient excitation of the resonant modes under both angles of illumination, through constructive interference between the incident and reflected fields inside the nano-posts.

Therefore, the nano-posts act as one-sided, multi-mode resonators. In some embodiments, for a wavelength of 915 nm, the meta-atoms are 500 nm tall, the $SiO_2$ layer, the $Al_2O_3$ layer, and the aluminum reflector are 125 nm, 30 nm, and 100 nm thick, respectively, and the lattice constant is 450 nm. A uniform array of U meta-atoms provides an angle-dependent response, so that TE-polarized light waves incident at 0° and 30° undergo different phase shifts ($\phi_1$ and $\phi_2$, respectively) as they are reflected from the array. A periodic array of U meta-atoms was simulated to find the reflection amplitude and phase at each incident angle. Any combination of $\phi_1$ and $\phi_2$ from 0 to $2\pi$ can be simultaneously obtained by properly choosing the in-plane dimensions of the meta-atoms (i.e. $D_x$, $D_y$, $D_{xin}$, and $D_{yin}$ as shown in FIG. 4). Therefore, any two arbitrary and independent phase profiles for TE-polarized 0° and 30° illumination angles can be designed simultaneously. The $D_x$, $D_y$, $D_{xin}$, and $D_{yin}$ parameters are defined in FIG. 3 as the two outer edges of the U shape, and the two inner edges of the U shape. In other words, the U shape can be seen, geometrically, as delimited by an outer rectangle and an inner rectangle. The two outer edges $D_x$, $D_y$ are the two edges of the outer delimiting rectangle, while the two inner edges, $D_{xin}$, $D_{yin}$ are the two edges of the inner delimiting rectangle.

The corresponding reflection amplitudes ($|r_1|$ and $|r_2|$), and phase shifts, are described in the present application. The independent control of phase, at different incident angles, is a result of exciting different modes of the U meta-atom under two distinct illumination angles. FIG. 5 illustrates the excited electric energy density for a typical meta-atom in a periodic array, at three different cross-sections under 0° and 30° incident angles. The exemplary meta-atom dimensions, and corresponding phases, at each illumination angle are shown in FIG. 4 by star symbols (405). Modes that are excited under 30° illumination angle are different from the excited modes at normal illumination, as seen in FIG. 5.

There are two categories of symmetric and antisymmetric resonant modes. In normal incidence, only symmetric modes are excited, while in oblique illumination both the symmetric and antisymmetric modes are excited. This is a factor in designing the independent control for different angles in a local metasurface. As the metasurface is still assumed to be local (i.e., the coupling between adjacent meta-atoms is negligible and therefore neglected in the design), any two arbitrary different wavefronts can be simultaneously designed for the two different illumination angles, by using the design graphs shown in FIG. 4. In addition, due to the symmetry of the nano-posts, (and also as verified from simulation results) the polarization conversion of the metasurface from TE to transverse magnetic (TM) is negligible.

Figure 6:
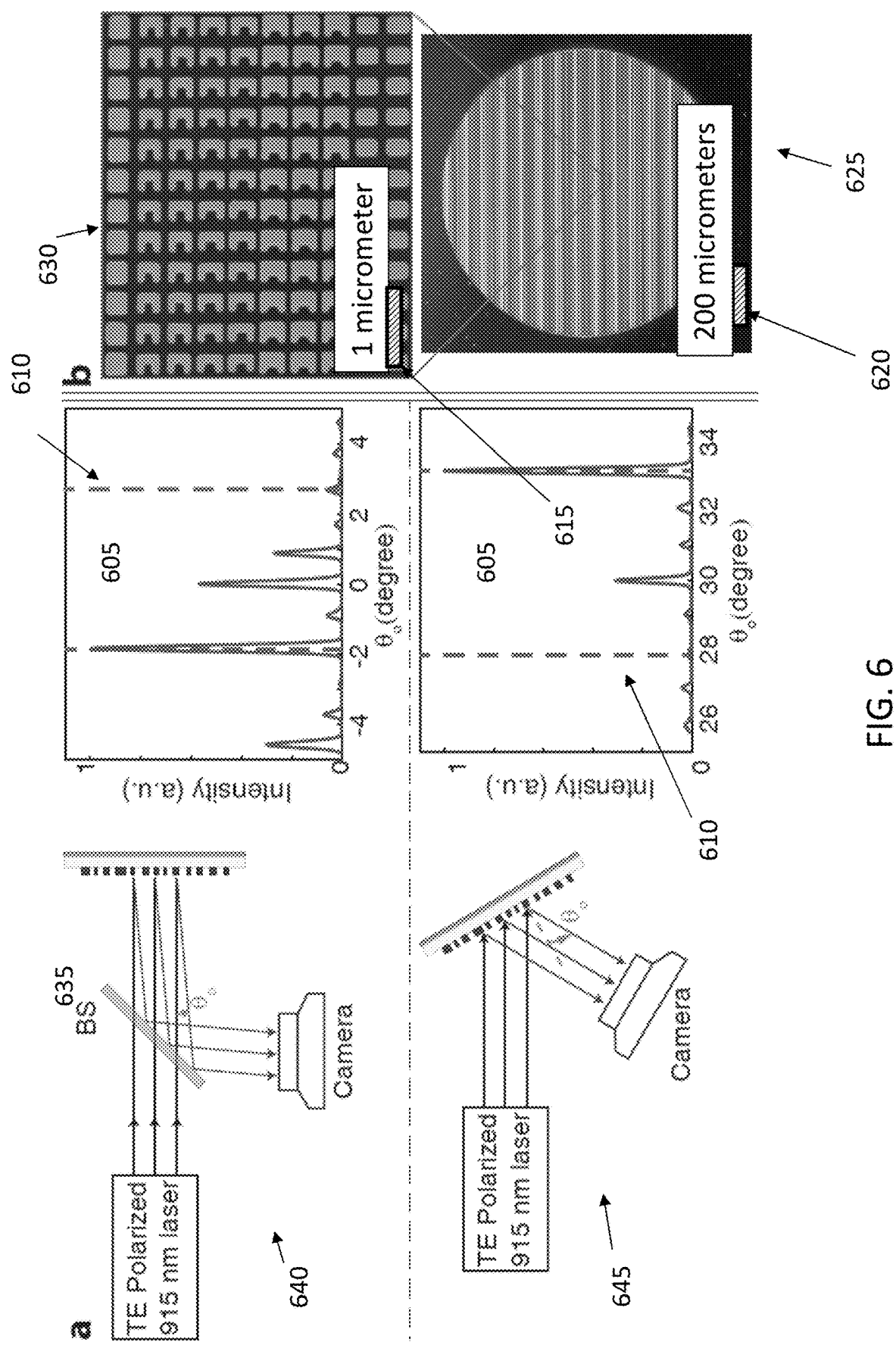
FIG. 6 illustrates a simplified schematic of a measurement setup, and measured reflectance.

FIG. 6, panel a, illustrates a simplified schematic of a measurement setup, and measured reflectance of the angle-multiplexed grating under normal illumination of TE-polarized light, as a function of the observation angle $\theta_0$ (605). The grating deflects 0° and 30° TE-polarized incident light to −1.85° and +33.2°, respectively. Dashed lines (610) indicate the designed deflection angles (−1.85° and +33.2° under 0° and 30° incidence, respectively), and the deflection angles corresponding to regular gratings with fixed grating periods (2.7° under normal and 27.88° under 30° illumination angle assuming grating periods of 21λ and 31λ, respectively). FIG. 6, panel b, reproduces an optical image (625) of the angle-multiplexed grating, with a scale bar (620) of 200 micrometers. The inset (630) shows a scanning electron micrograph of the top view of meta-atoms composing the metasurface, with a scale bar (615) of 1 micrometer. The setup of FIG. 6 includes a beam splitter (BS,635).

Figure 7:
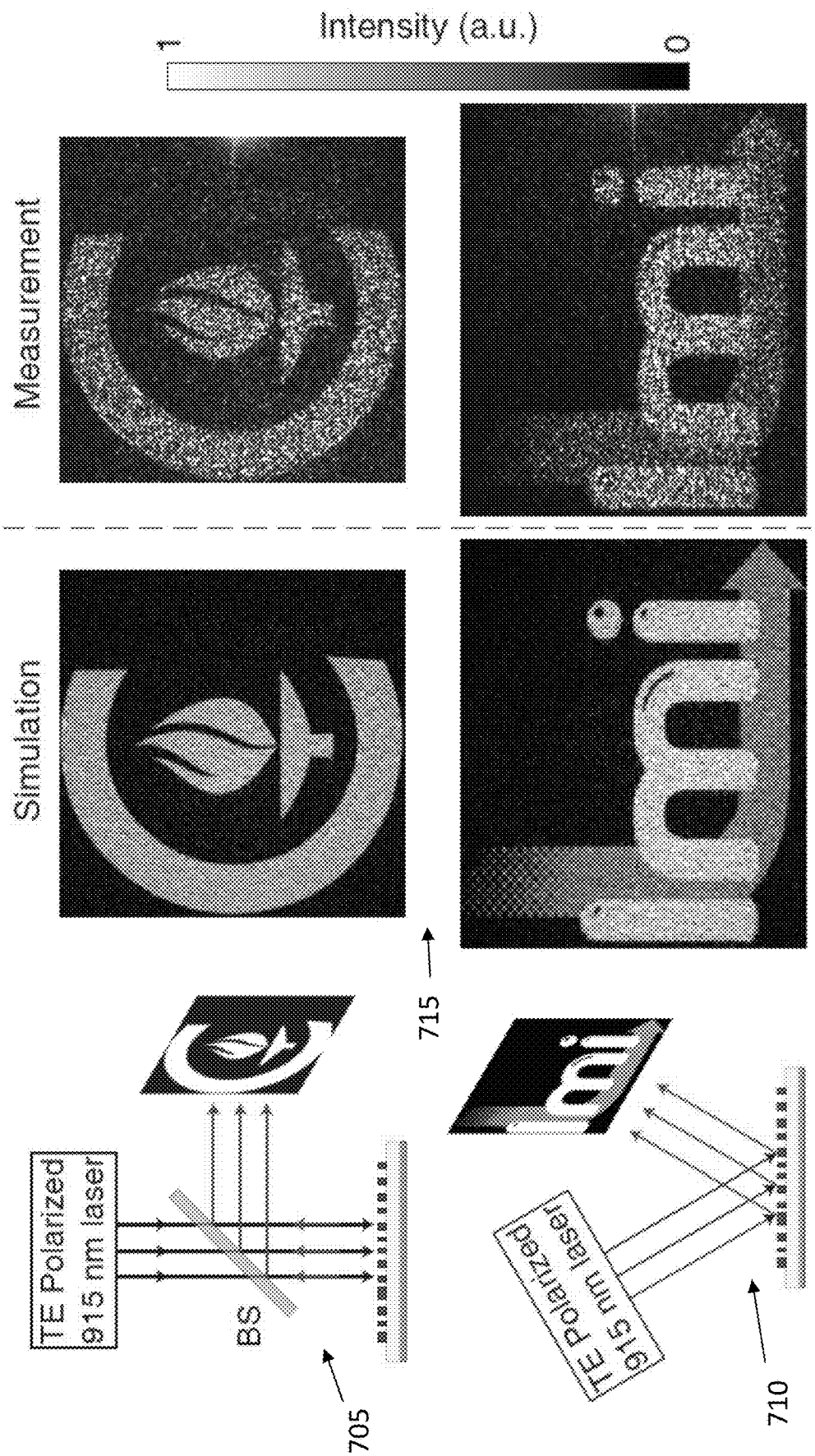
FIG. 7 illustrates an angle-multiplexed hologram.
Figure 8:
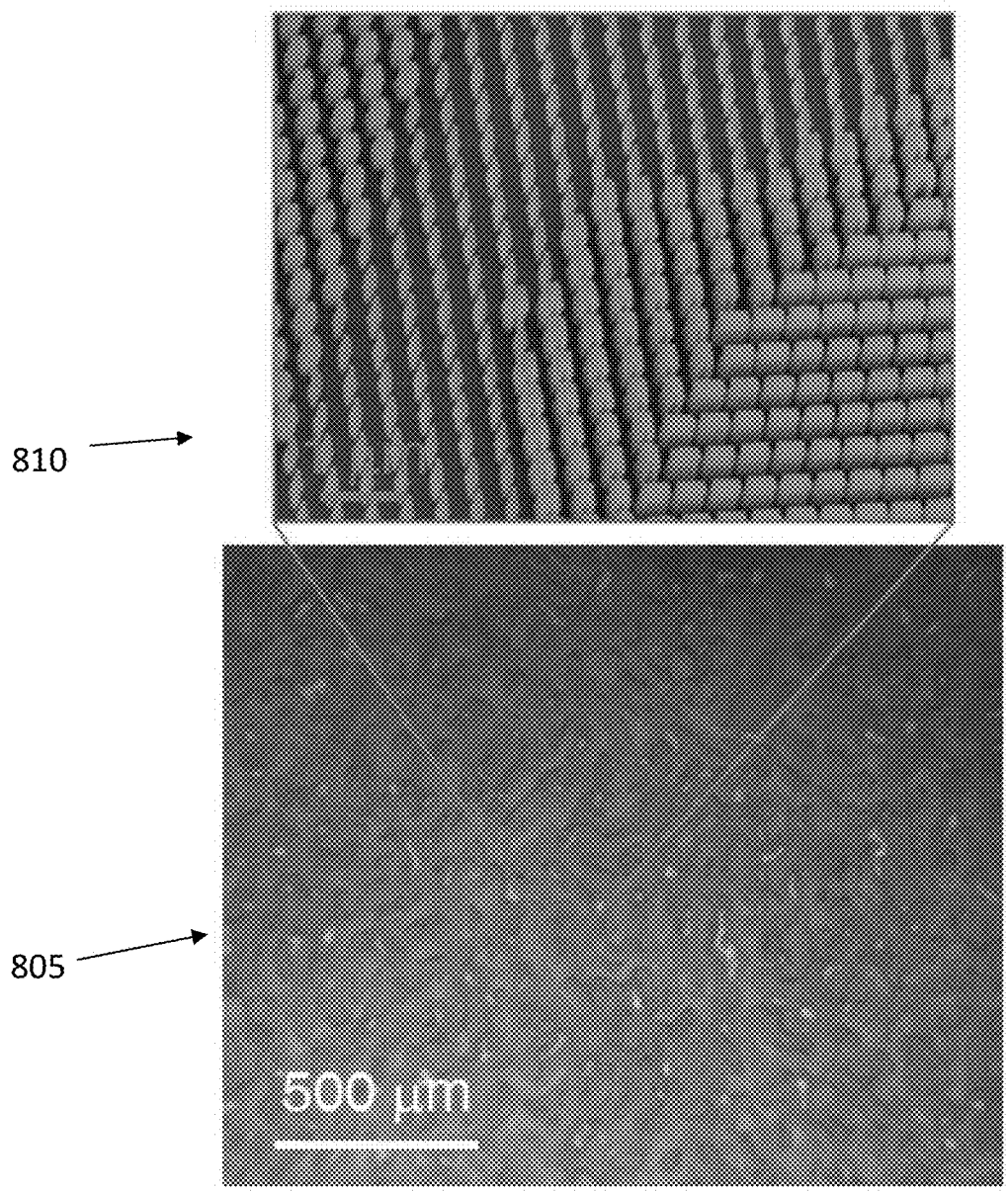
FIG. 8 illustrates an optical image and a scanning electron micrograph of the hologram.

FIG. 7 illustrates an exemplary angle-multiplexed hologram. FIG. 7 illustrates a simplified drawing of the measurement setups under normal (705) and 30° illumination (710) angles. The angle-multiplexed hologram is designed to create two different images under different incident angles. In FIG. 7, two different logos become visible, under 0° and 30° incident angles. Simulated and measured reflected images captured under 915-nm TE-polarized light at 0° and 30° illumination angles are also shown (715). FIG. 8 illustrates an optical image of a portion of the angle-multiplexed hologram (805). The inset (810) shows a scanning electron micrograph under oblique view of meta-atoms composing the metasurface.

The metasurfaces of the present disclosure are capable of simultaneously controlling the phase of light at two distinct incident angles, in turn allowing the implementation of a variety of new compact optical components. To demonstrate the versatility of these metasurfaces, two examples of angle-multiplexed metasurfaces are described in the following. The first example consists in an angle-multiplexed grating designed to operate at 0° and 30° incident angles, with two different effective grating periods. The angle-multiplexed grating has a diameter of 1 mm and deflects 915 nm TE-polarized light incident at 0° and 30°. The light incident at 0° is reflected at −1.85°, while the light incident at 30° is reflected at +33.2°. The corresponding effective periods are 31λ (blazed for −1 diffraction order) for the light incident at 0°, and 21λ (blazed for +1 diffraction order) for the light incident at 30°. In this example, λ=915 nm is the free space wavelength. The metasurfaces were fabricated using standard semiconductor fabrication techniques.

Optical and scanning electron microscope images of the fabricated angle-multiplexed grating are shown in FIG. 6, panel b. FIG. 6 panel a illustrates the measured diffracted light intensities versus angle, under 0° (640) and 30° (645) TE-polarized illuminations, as well as the simplified measurement setup schematics. The measured reflectance, as a function of observation angle, shows a dominant peak at the designed angles (i.e. −1.85° under normal illumination and +33.2° under 30° incident angle). Dashed lines (610) show deflection angles corresponding to both effective periods, which are 31λ (blazed for −1 diffraction order) and 21λ (blazed for +1 diffraction order). A regular grating with a 31λ period, blazed for −1 diffraction order, would deflect normal incidence into −1.85°, and a 30° incident angle into 27.88°. Similarly, another regular grating with a 21λ period, blazed for +1 diffraction order, would deflect normal incidence into +2.7° and a 30° incident angle into 33.2°. The angle-multiplexed grating, on the other hand, deflects 0° and 30° incident angles into −1.85° and +33.2° respectively, with no strong deflection peaks at the angle corresponding to the other grating periods (which would be +2.7° and 27.88°).

The deflection efficiency of the grating at each incident angle is defined as the power deflected by the grating to the desired order, divided by the power reflected from a plain aluminum reflector. For the exemplary metasurface described above, deflection efficiencies of 30% and 41% were measured under 0° and 30° incident angles, respectively. For comparison, the central ~200 μm-long portion of the grating was simulated with a finite difference, time domain, full-wave electromagnetic solver. The simulated deflection efficiencies are 63% and 54% for 0° and 30° operation, respectively. To consider the possible fabrication errors, the grating was also simulated with a random error added to all in-plane sizes of the meta-atoms. The error is normally distributed with a zero mean, a 4 nm standard deviation, and a forced maximum of 8 nm. For the metasurface with the added errors, the simulated deflection efficiencies are 46% and 39% under 0° and 30° incident angles. The remaining difference between simulated and measured efficiencies can be attributed to two factors. As the first factor, the deposited aluminum reflected layer has a significant surface roughness. This may result in the existence and excitation of local surface plasmon resonances that contribute to both increased loss and reflection phase error. With regard to the second factor, to counter the effects of systematic fabrication errors, an array of gratings with different biases added to each size of the meta-atoms was fabricated. In the measurements, one of the devices with good performance under both illumination angles was selected and characterized (i.e., there are other fabricated gratings that demonstrate higher efficiencies for one of the angles).

As a result, the characterized device might differ from the one with sizes closest to design values. This issue may justify the different balances between measured and simulated values for efficiencies under the two illumination angles.

As a second example of a metasurface, an angle-multiplexed hologram which projects two different images under 0° and 30° illumination angles was designed, fabricated, and characterized. The hologram covers a 2 mm by 2 mm square, and projects the two different logos when illuminated by TE-polarized light at 915 nm at 0° and 30° incident angles. Optical and scanning electron microscope images of a portion of the fabricated hologram are shown in FIG. 8. Simulated and measured intensity profiles for two different illumination angles (705,710) are shown in FIG. 7, along with simplified schematics of the measurement setups. A logo is created under normal illumination. By scanning the incident angle from 0° to 30°, the projected image changes from one logo to the other logo. The good agreement between the simulation and measurement results confirms the independent control of this platform over distinct incident angles. In order to avoid an overlap between the holographic image and the zeroth-order diffraction, the holograms are designed to operate off axis.

The angle-multiplexed metasurfaces allow the fabrication of devices that perform completely independent functions (i.e. grating, lens, hologram, orbital angular momentum generator, etc.) for different angles of illumination. It can be noted that the concept and implementation of the angle-multiplexed metasurfaces are fundamentally different from multi-order gratings. While the multi-order gratings can be designed such that the efficiencies of different diffraction orders vary with the incident angle, the grating momentum corresponding to each order (which is locked to the period of the grating) remains fixed. This difference becomes much clearer when considering the case of holograms. Unlike the metasurfaces of the present disclosure, it is not possible to encode in a multi-order holographic optical element (i.e., the generalized case of the multi-order gratings) two completely independent phase profiles corresponding to two completely independent functions.

The present disclosure describes optical metasurfaces that break the angular correlation of thin diffractive components, and enable devices where independent phase masks can be embedded in a single thin layer and accessed separately under different illumination angles. In the examples of the present disclosure, the shape of the meta-atom was chosen intuitively. However, in some embodiments more advanced optimization procedures can be applied to determine the shape of the scattering elements. The independent control of the metasurfaces can be extended to more angles and the device performance can be improved significantly by using more advanced optimization procedures. From a technological point of view, this is a novel class of metasurfaces that opens the path towards ultracompact multifunctional flat devices not feasible otherwise. These metasurfaces are complementary to the previously demonstrated independent control over different polarizations or wavelengths of the incident light, and thus significantly expands the range of applications for nano-engineered metasurfaces.

To find the reflection amplitude and phase of a uniform array of meta-atoms, the rigorous coupled wave analysis (RCWA) technique was used. A normal and a 30° incident plane wave at 915 nm wavelength were used as the excitation, and the amplitude and phase of the reflected wave were extracted. The subwavelength lattice for both normal and oblique illumination angles results in the excitation of only the zeroth order diffracted light. This justifies the use of only one reflection value at each illumination angle for describing the optical behavior of the meta-atom at each illumination angle. The α-Si layer was assumed to be 500 nm thick. The $SiO_2$ and aluminum layers were assumed to be 125 nm and 100 nm thick, respectively. Refractive indices at 915 nm wavelength were assumed as follows: α-Si: 3.558, SiO2: 1.44, Al2O3: 1.7574, and Al: 1.918-i8.3447. The meta-atom in-plane dimensions ($D_x$, $D_y$, $D_{xin}$, and $D_{yin}$) are swept such that the minimum feature size remains larger than 50 nm for relieving fabrication constraints.

The optimum meta-atom dimensions for each lattice site at the two incident angles were found by minimizing the total reflection error, which is defined as $\varepsilon = |exp(i\phi_1) - r_1|^2 + |exp(i\phi_2) - r_2|^2$, where $r_1$ and $r_2$ are the complex reflection coefficients of the unit cell at the two incident angles. Therefore, for any desired combination of phases $\phi_1$ and $\phi_2$ in the 0 to $2\pi$ range at the two incident angles, there is a corresponding meta-atom (i. e., $D_x$, $D_y$, $D_{xin}$, and $D_{yin}$ values) that minimizes the reflection error. To limit the rapid jumps in dimensions shown in FIG. 4, some modification terms were added to the reflection error in order to ensure that adjacent dimensions are preferred for the adjacent phases. The modification terms were defined as an exponential function of the Euclidean distance between the in-plane dimensions of the meta-atoms for adjacent phase values.

The holograms of different incident angles were designed individually using the Gerchberg-Saxton (GS) algorithm with ~3° deflection angles. The simulation results presented in FIG. 7 were computed by assuming that the coupling among adjacent meta-toms are negligible, such that each meta-atom imposes the exact complex reflection amplitude found from simulations of the periodic structure. The hologram area was assumed to be illuminated uniformly with 0° and 30° incident angle plane waves, and the projected holographic images were found by taking the Fourier transform of the field after being reflected from the phase mask.

To fabricate an exemplary metasurface, a ~100 nm aluminum layer was evaporated on a silicon wafer, followed by a ~30 nm $Al_2O_3$ layer. A 125 nm-thick $SiO_2$ and a 500 nm thick α-Si layer were subsequently deposited using the plasma enhanced chemical vapor deposition (PECVD) technique at 200° C. An e-beam lithography system was used to define the pattern in a ~300 nm thick layer of a positive electron-beam resist (spin coated at 5000 rpm for 1 min). The pattern was developed in the resist developer for 3 minutes. A ~50 nm thick $Al_2O_3$ layer was evaporated on the sample, and the pattern was then transferred to the $Al_2O_3$ layer by a lift off process. The patterned $Al_2O_3$ hard mask was then used to dry etch the α-Si layer in a mixture of $SF_6$ and $C_4F_8$ plasma. The $Al_2O_3$ mask was removed in a 1:1 solution of ammonium hydroxide and hydrogen peroxide at 80° C.

The angle-multiplexed grating was measured using the setup described in the following. A 915 nm fiber-coupled semiconductor laser was used for illumination and a fiber collimation package was used to collimate the incident beam. A polarizer was inserted to confirm the TE polarization state of the incident light. An additional lens with a focal length of 10 cm was placed before the grating at a distance of ~8 cm to partially focus the beam and reduce the beam divergence after being deflected by the grating in order to decrease the measurement error. The light deflected from the device was imaged using a custom built microscope. The microscope consists of a 10× objective lens and a tube lens with a focal distance of 20 cm, which images the object plane onto a camera. A rotation stage was used to adjust the illumination angle and a 50/50 beamsplitter was inserted before the grating for measurements under normal illumination. For efficiency measurements of the grating, an iris was used to select the desired diffraction order and block all other diffraction orders. A power meter with a photodetector was used to measure the deflected power off the grating, as well as the reflected power from a plain aluminum reflector (from an area adjacent to the grating). The grating efficiency was calculated by dividing the power deflected to the desired order to the power reflected by the aluminum reflector. Neutral density (ND) filters were used to adjust the light intensity and decrease the background noise captured by the camera.

Figure 11:
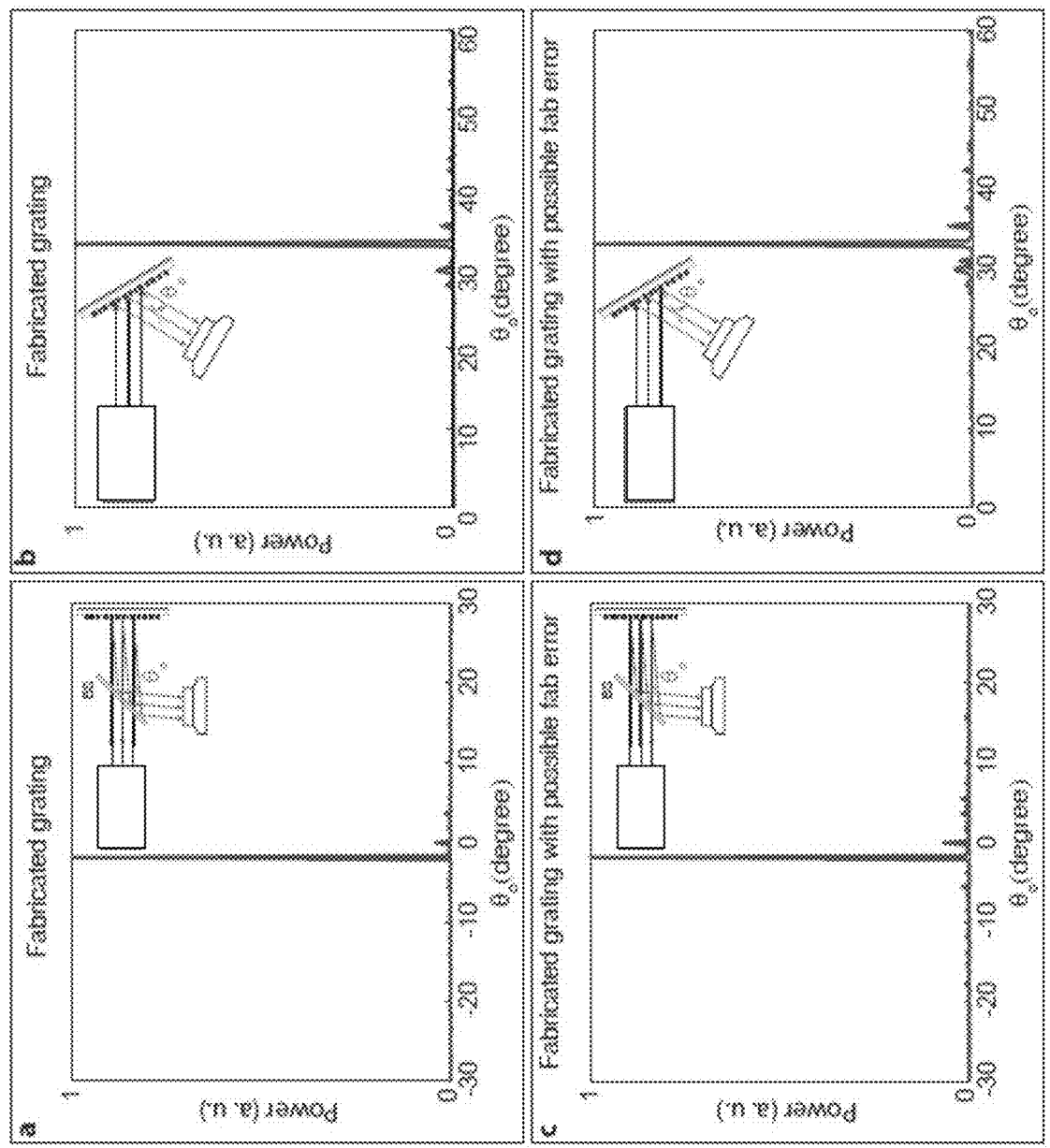
FIG. 11 illustrates simulation results of the angle-multiplexed grating.

The angle-multiplexed hologram was characterized using the setup shown schematically in FIG. 11. The setup is similar to the grating measurement setup with some modifications. The 10 cm focal distance lens used to partially focus light to the grating was removed to obtain a relatively uniform illumination of the hologram area. The input beam being larger than the device in addition to fabrication imperfections results in a strong zeroth-order diffraction. The zeroth-order diffraction is cropped in FIG. 7, as it is outside the holographic image of interest due to the off-axis design of the hologram. The custom-built microscope was also altered as follows: the objective lens was used to generate a Fourier transform of the hologram plane in its back focal plane. The tube lens was replaced by a lens with a focal length of 6 cm, which images the back focal plane of the objective into the camera. Two rotation stages were used in order to be able to independently rotate the device and the illumination beam. The camera and the imaging setups were not on the rotation stages.

The central ~200 µm long portion of an exemplary grating, as discussed above, was simulated for comparison with the experimental results. The simulated grating is 445 lattice constants long in the x direction and 1 lattice constant long in the y direction. Periodic boundary condition was considered in the y direction. The grating was simulated at the wavelength of 915 nm, and normal and 30° incident y-polarized (TE) plane-waves were used as the excitation. Angular distribution of the reflected power at 0° and 30° incident angles are shown in FIG. 11, respectively. The far field reflected power was analyzed by taking the Fourier transform of the reflected field above the meta-atoms. The deflection efficiency was calculated by dividing the deflected power to the desired order by the total input power. The simulated deflection efficiency for 0° and 30° incident angles were 63% and 54% respectively. Existence of no other strong diffraction order in FIG. 11, and the high deflection efficiencies achieved demonstrate the independent control of the platform at each incident angle. To consider the possible fabrication errors, the grating with a random error added to all the in-plane sizes of the meta-atoms is also simulated. The error is normally distributed with a zero mean, a 4 nm standard deviation, and a forced maximum of 8 nm. Angular distribution of the reflected power at 0° and 30° incident angles for the grating with a random error are shown in FIG. 11, respectively. The simulated deflection efficiencies with the added errors are 46% and 39% under 0° and 30° incident angles. Although the deflection efficiency of the grating drops by adding a random error, its general functionality remains the same according to the FIG. 11.

Figure 9:
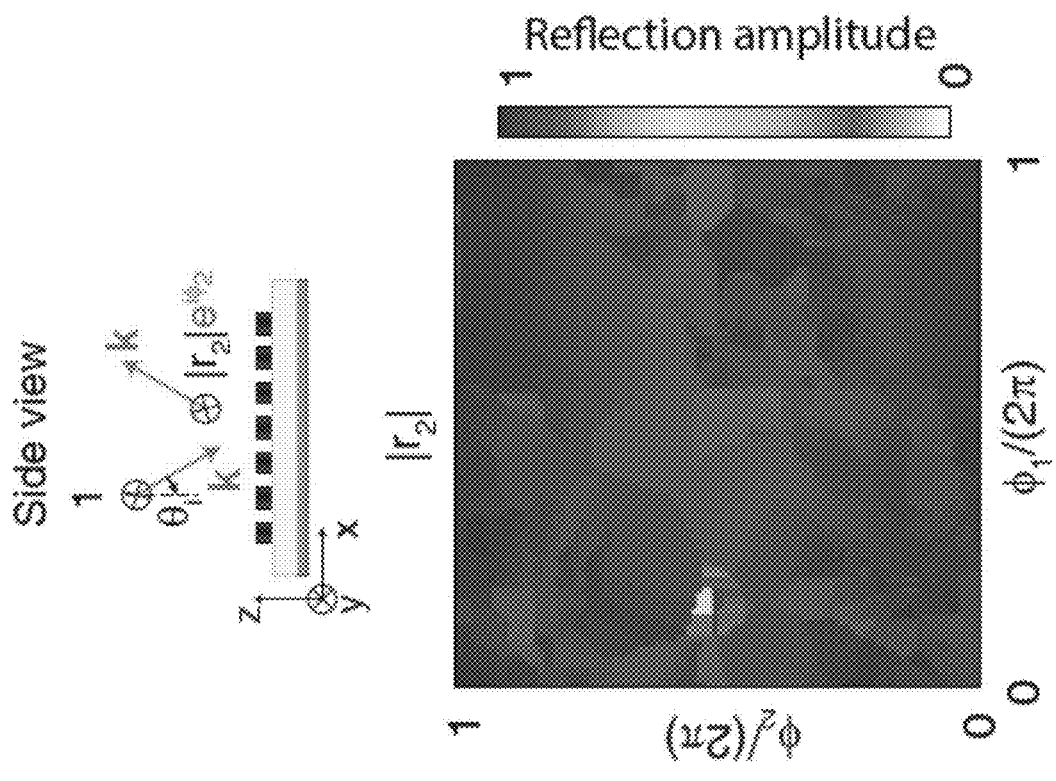
FIGS. 9-10 illustrate simulated achieved reflection amplitudes and phases for the selected meta-atoms.
Figure 9:
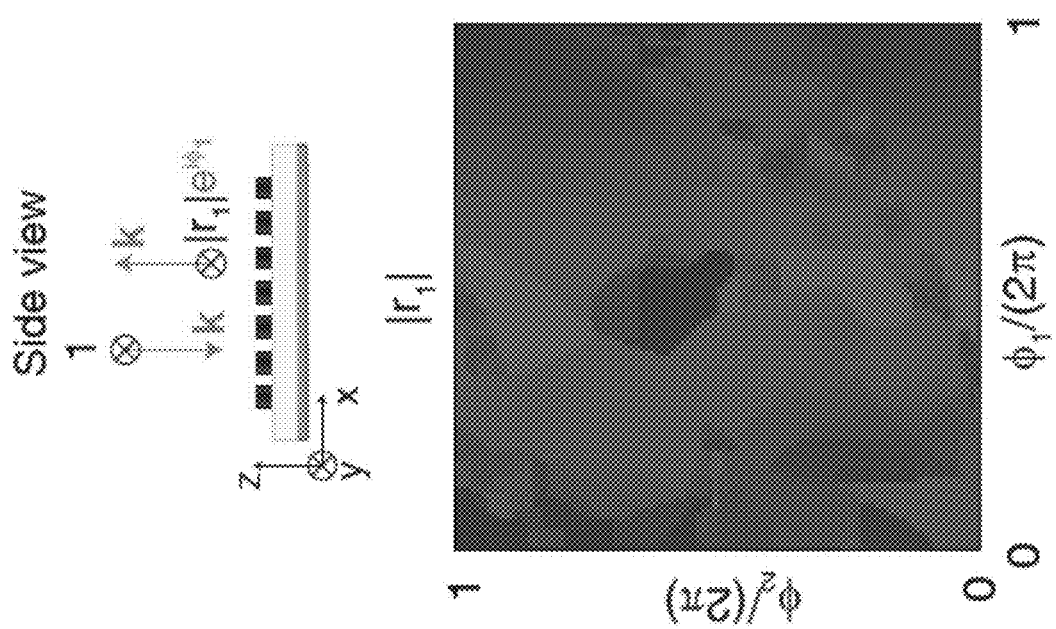
Figure 10:
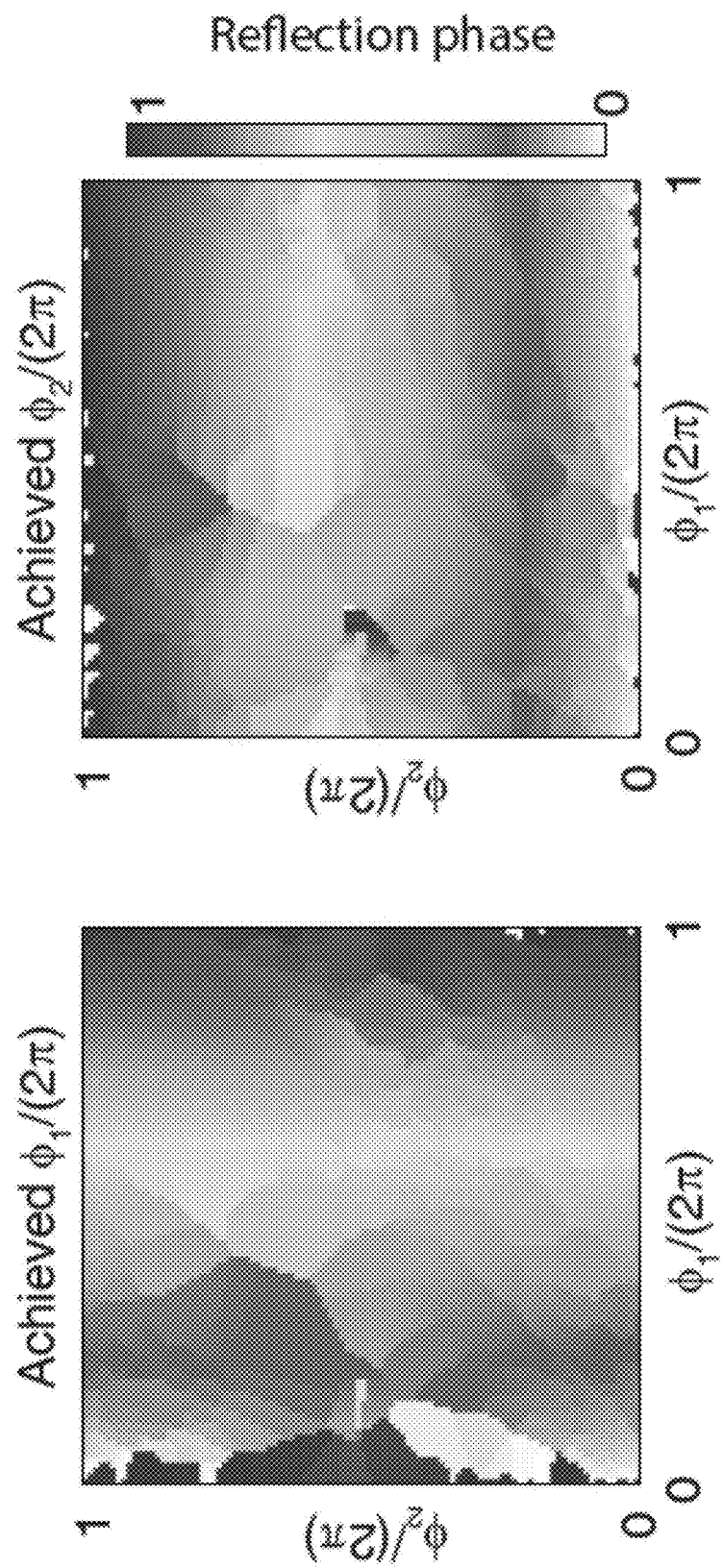

FIGS. 9-10 illustrate simulated achieved reflection amplitudes and phases for the selected meta-atoms. FIG. 9 illustrates the simulated reflection amplitudes at 0° and 30° incident angles as a function of required phase shifts for the periodic array of selected meta-atoms that can span the full $2\pi$ by $2\pi$ phases for both incident angles. FIG. 10 illustrates the simulated achieved phase shifts of the chosen nano-posts versus the required phase shift values.

FIG. 11 illustrates simulation results of the angle-multiplexed grating. Panels a and b illustrate the distribution of reflected power versus observation angle under 0° (panel a) and 30° (panel b) incident angles for a ~200 µm long portion of the fabricated grating. Panels c and d illustrate the same graphs as panels a and b, but with a random error added to all in-plane sizes of the meta-atoms. The error is normally distributed with a zero mean, a 4 nm standard deviation, and a forced maximum of 8 nm.

In some embodiments, the incident light has an angle measured from a direction normal to a top surface of the metasurface. In some embodiments, the cross section dimensions of the U shape, as illustrated in FIG. 4, are measured in nm. Therefore, in some embodiments, $D_x$ is between 60 and 390 nm, $D_y$ is between 150 and 390 nm, $D_{xin}$ is between 0 and 240 nm, and $D_{yin}$ is between 0 and 180 nm. In some embodiments, to design the dimensions of a scattering element, the plots of FIG. 4 are used, so that each of the four parameters is chosen according to the designed phase shifts, $\phi_1$ and $\phi_2$. In some embodiments, the spacer layer acts as a substrate if the metasurface is designed to operate in transmission mode.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] Arbabi, E., Arbabi, A., Kamali, S. M., Horie, Y. and Faraon, A. High efficiency double-wavelength dielectric metasurface lenses with dichroic birefringent meta-atoms. Opt. Express 24, 18468-18477 (2016).

[2] Arbabi, E., Arbabi, A., Kamali, S. M., Horie, Y. and Faraon, A. Multiwavelength polarization-insensitive lenses based on dielectric metasurfaces with meta-molecules. Optica 3, 628-633 (2016).

[3] Kamali, S. M., Arbabi, A., Arbabi, E., Horie, Y. and Faraon, A. Decoupling optical function and geometrical form using conformal flexible dielectric metasurfaces. Nat. Commun. 7 (2016).

[4] Arbabi, A., Arbabi, E., Horie, Y., Kamali, S. M. and Faraon, A. Planar metasurface retroreflector. Nat. Photonics 11, 415-420 (2017).

[5] Arbabi, A. et al. Miniature optical planar camera based on a wide-angle metasurface doublet corrected for monochromatic aberrations. Nat. Commun. 7 (2016).

[6] Arbabi, E., Arbabi, A., Kamali, S. M., Horie, Y. and Faraon, A. Multiwavelength metasurfaces through spatial multiplexing. Sci. Rep. 6 (2016).

What is claimed is:

1. A metasurface comprising:
   a metallic reflector;
   a spacer layer on the metallic reflector; and
   an array of scattering elements on the spacer layer, each scattering element of the array of scattering element having a height, and a substantially rectangular U-shaped cross section defined by four cross section dimensions,
   wherein:
   the four cross section dimensions are $D_x$, $D_y$, $D_{xin}$, and $D_{yin}$,
   at least one scattering element of the array of scattering elements has a different value than at least one other scattering element of the array of scattering elements, for at least one of $D_x$, $D_y$, $D_{xin}$, and $D_{yin}$,
   the height and $D_x$, $D_y$, $D_{xin}$, and $D_{yin}$ for each scattering element of the array of scattering elements are selected so that a first electromagnetic wave incident at a first angle to the metasurface is reflected with a first phase shift, and a second electromagnetic wave incident at a second angle to the metasurface is reflected with a second phase shift,
   the first angle is different from the second angle, and
   the first phase shift is different from the second phase shift;
   wherein the spacer layer comprises silicon dioxide and the array of scattering elements comprises amorphous silicon.

2. The metasurface of claim 1, wherein the metallic reflector is Al.

3. The metasurface of claim 2, wherein the spacer layer further comprises an alumina layer between the metallic reflector and the spacer layer.

4. The metasurface of claim 2, wherein the height is 500 nm, the spacer layer is 125 nm thick, the metallic reflector is 100 nm thick, and the array of scattering elements is arranged as a square lattice wherein spacing between scattering elements of the array of scattering elements is 450 nm.

5. The metasurface of claim 1, wherein the first angle is 0° and the second angle is 30° as measured from a direction normal to a top surface of the metasurface.

6. The metasurface of claim 1, wherein $D_x$ is between 60 and 390 nm, $D_y$ is between 150 and 390 nm, $D_{xin}$ is between 50 and 240 nm, and $D_{yin}$ is between 50 and 180 nm.

7. The metasurface of claim 6, further comprising substantially rectangular scattering elements having a height and cross section dimensions $D_{xrec}$ and $D_{yrec}$, wherein $D_{xrec}$ is between 60 and 390 nm and $D_{yrec}$ is between 150 and 390 nm.

8. A metasurface comprising:
   a spacer layer; and an array of scattering elements on the spacer layer, each scattering element of the array of scattering element having a height, and a substantially rectangular U-shaped cross section defined by four cross section dimensions, wherein:

the four cross section dimensions are $D_x$, $D_y$, $D_{xin}$, and $D_{yin}$, at least one scattering element of the array of scattering elements has a different value of at least one of $D_x$, $D_y$, $D_{xin}$, and $D_{yin}$, the height and $D_x$, $D_y$, $D_{xin}$, and $D_{yin}$ for each scattering element of the array of scattering elements are selected so that a first electromagnetic wave incident at a first angle to the metasurface is transmitted with a first phase shift, and a second electromagnetic wave incident at a second angle to the metasurface is transmitted with a second phase shift, the first angle is different from the second angle, and the first phase shift is different from the second phase shift;

wherein the spacer layer comprises silicon dioxide and the array of scattering elements comprises amorphous silicon.

9. The metasurface of claim 8, wherein the spacer layer further comprises an alumina layer.

10. The metasurface of claim 8, wherein the height is 500 nm, the spacer layer is 125 nm thick, and the array of scattering elements is arranged as a square lattice wherein spacing between scattering elements of the array of scattering elements is 450 nm.

11. The metasurface of claim 8, wherein the first angle is 0° and the second angle is 30° as measured from a direction normal to a top surface of the metasurface.

12. The metasurface of claim 8, wherein $D_x$ is between 60 and 390 nm, $D_y$ is between 150 and 390 nm, $D_{xin}$ is between 50 and 240 nm, and $D_{yin}$ is between 50 and 180 nm.

13. The metasurface of claim 12, further comprising substantially rectangular scattering elements having a height and cross section dimensions $D_{xrec}$ and $D_{yrec}$, wherein $D_{xrec}$ is between 60 and 390 nm and $D_{yrec}$ is between 150 and 390 nm.

14. A method comprising:

for an array of scattering elements, each scattering element of the array of scattering element having a height, and a substantially rectangular U-shaped cross section defined by four cross section dimensions, calculating values of the height and of the four cross section dimensions generating a first phase shift and a second phase shift; and fabricating a metasurface comprising the array of scattering elements, based on the calculated values of the height of the four cross section dimensions, so that a first electromagnetic wave incident at a first angle to the metasurface is reflected with the first phase shift, and a second electromagnetic wave incident at a second angle to the metasurface is reflected with the second phase shift, wherein:

the four cross section dimensions are $D_x$, $D_y$, $D_{xin}$, and $D_{yin}$, at least one scattering element of the array of scattering elements has a different value than at least one other scattering element of the array of scattering elements, for at least one of $D_x$, $D_y$, $D_{xin}$, and $D_{yin}$, the first angle is different from the second angle, and the first phase shift is different from the second phase shift;

wherein the spacer layer comprises silicon dioxide and the array of scattering elements comprises amorphous silicon.

15. The method of claim 14, wherein the metasurface further comprises a metallic reflector comprising Al, a spacer layer on the metallic reflector, and wherein the array of scattering elements is on the spacer layer.

16. The method of claim 15, wherein the spacer layer further comprises an alumina layer between the metallic reflector and the spacer layer.

17. The method of claim 15, wherein the height is 500 nm, the spacer layer is 125 nm thick, the metallic reflector is 100 nm thick, and the array of scattering elements is arranged as a square lattice wherein spacing between scattering elements of the array of scattering elements is 450 nm.

18. The method of claim 14, wherein the first angle is 0° and the second angle is 30° as measured from a direction normal to a top surface of the metasurface.

19. The method of claim 14, wherein $D_x$ is between 60 and 390 nm, $D_y$ is between 150 and 390 nm, $D_{xin}$ is between 50 and 240 nm, and $D_{yin}$ is between 50 and 180 nm.

20. The method of claim 19, wherein the metasurface further comprises substantially rectangular scattering elements having a height and cross section dimensions $D_{xrec}$ and $D_{yrec}$, wherein $D_{xrec}$ is between 60 and 390 nm and $D_{yrec}$ is between 150 and 390 nm.

* * * * *